United States Patent [19]

Kuribayashi et al.

[11] 4,282,708
[45] Aug. 11, 1981

[54] METHOD FOR THE SHUTDOWN AND RESTARTING OF COMBINED POWER PLANT

[75] Inventors: Tetsuzo Kuribayashi; Tsuguo Hashimoto, both of Hitachi, Japan

[73] Assignee: Hitachi, Ltd., Tokyo, Japan

[21] Appl. No.: 68,562

[22] Filed: Aug. 22, 1979

[30] Foreign Application Priority Data

Aug. 25, 1978 [JP] Japan .................. 53/102913

[51] Int. Cl.³ .................. F02C 7/00; F02G 5/02
[52] U.S. Cl. .................. 60/39.02; 60/39.18 B; 60/646
[58] Field of Search ........ 60/39.02, 39.14 R, 39.18 B, 60/646, 657

[56] References Cited

U.S. PATENT DOCUMENTS

| 3,879,616 | 4/1975 | Baker et al. | 60/39.18 B |
| 3,882,680 | 5/1975 | Dorrant et al. | 60/646 |
| 4,081,956 | 4/1978 | Baker et al. | 60/39.18 B |
| 4,168,608 | 9/1979 | Uram et al. | 60/39.18 B |

Primary Examiner—Louis J. Casaregola
Attorney, Agent, or Firm—Craig and Antonelli

[57] ABSTRACT

In shutting down a combined power plant, a steam turbine is first shutdown while operation of a gas turbine at high load is being continued, and the steam generated in a waste heat recovery boiler is passed on to a condenser through a bypass system bypassing the steam turbine. The gas turbine is then shutdown when this condition prevails, and gland sections of the steam turbine receive a supply of gland sealing steam which has been heated by a heater to a temperature level close to that of the steam attained while the steam turbine is in operation, thereby to maintain the temperature of the metal of the steam turbine gland sections at a desired level during the time the steam and gas turbines are shutdown. In restarting the combined plant, the gas turbine is first started and then the steam turbine is started.

5 Claims, 10 Drawing Figures

METHOD FOR THE SHUTDOWN AND RESTARTING OF COMBINED POWER PLANT

BACKGROUND OF THE INVENTION

This invention relates to a method for the shutdown and restarting of a combined plant including, in combination, a gas turbine and a steam turbine. More particularly, the invention is concerned with a method of reducing the restarting time of the combined plant.

A combined plant including a gas turbine and a steam turbine is suitable to use as a medium size heat power plant which is started and shutdown everyday, because the gas turbine is capable of being started quickly and the steam turbine has a superb starting and shutdown characteristic under the low-pressure and low-temperature steam conditions (approximately, 50 to 80 Kg/cm$^2$g and 450° to 500° C.).

In shortening the time required for starting the combined plant, the end can be attained by reducing the starting time for the steam turbine to shorten the overall starting time of the combined plant, since it has already been possible to start the gas turbine in about ten minutes. The end of shortening the starting time for the steam turbine can be attained by shutting down the steam turbine while maintaining the steam turbine metal at a high temperature level at the time of shutdown and by restarting the steam turbine while the steam turbine metal is maintained at a high temperature level, because the variation in temperature of turbine metal from the time the steam turbine is started to the time the steam turbine operates at rated load can be reduced and thus thermal stress can be reduced if the temperature of turbine metal can be kept at a high level as aforesaid. Thus, the reduction in the restarting time of the combined plant can be achieved.

However, in the combined plant including in combination a gas turbine and a steam turbine, the temperature of the waste gas from the gas turbine has a characteristic such that the lower the load imposed on the gas turbine, the lower the temperature of the waste gas becomes. And the temperature of steam generated in a waste heat recovery boiler by utilizing the waste gas of the gas turbine becomes lower as the load is reduced. Thus, the combined plant has had the disadvantage that the temperature of the main steam supplied to the steam turbine also drops when the plant is shut down, so that the temperature of the steam turbine metal drops when the steam turbine is shut down.

SUMMARY OF THE INVENTION

An object of the present invention is to provide a method for the shutdown and restarting of a combined plant which is capable of restarting its steam turbine in the condition that the steam turbine metal is kept at a high temperature level, when the plant is restarted.

One of the characteristic features of the present invention resides in the fact that, in a combined plant including in combination a gas turbine and a steam turbine, the steam turbine is shutdown when the main steam has a high temperature because of the fact that the gas turbine is operating at high load, in order to maintain the temperature of the steam turbine metal at a highest possible level when the steam turbine is shutdown, and that the steam generated in a waste heat recovery boiler is passed on to a condenser through a bypass system bypassing the steam turbine.

Another characteristic feature of the invention resides in the fact that, in a combined power plant including in combination a gas turbine and a steam turbine, a heater is provided in a system in which the steam generated in the waste heat recovery boiler (drum steam or steam at the outlet of superheater), main steam, steam of other units, or steam of an auxiliary boiler is used as turbine gland sealing steam, so that the turbine gland sealing steam supplied to the steam turbine when it is started or shutdown or while being shutdown can be heated to a temperature level substantially equal to that of the metal of the steam turbine gland sections.

A further and more concrete characteristic feature of the invention resides in the fact that a heater is provided only in the gland sealing steam line for the high pressure turbine of the steam turbine, so that only the gland sealing steam supplied to the high pressure turbine at startup or shutdown, or during shutdown, of the steam turbine can be heated to a temperature level substantially equal to that of the metal of the gland section of the high-pressure turbine.

DESCRIPTION OF THE PREFERRED EMBODIMENTS

Figure 1:
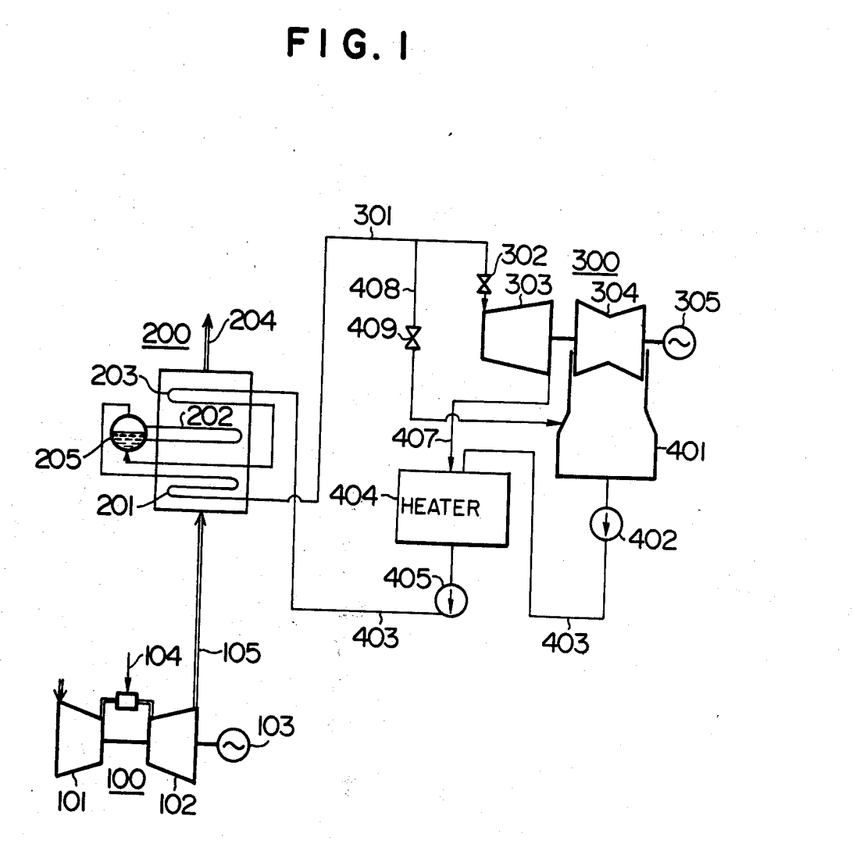
FIG. 1 is a systematic view showing, in general, the layout of a combined power plant including in combination a gas turbine and a steam turbine.

FIG. 1 shows, in general, the system of a combined power plant including a gas turbine and a steam turbine in combination, to which the present invention may be applied. In FIG. 1, a gas turbine generating device 100 comprises an air compressor 101, a gas turbine 102, a combuster 104 for blowing a fuel into the air pressurized by the air compressor 101 and causing combustion to take place to generate gas for driving the gas turbine 102, and a generator 103 driven by the gas turbine 102 to generate electricity. Exhaust gases from the gas turbine 102 are led through a duct 105 to a waste heat recovery boiler 200 and released to atmosphere through a smokestack 204 after the heat of the exhaust gases is recovered. The waste heat recovery boiler 200 has installed therein a superheater 201, an evaporator 202, a drum 205 and a fuel economizer 203 arranged in the indicated order from the upstream to the downstream sides of the flow of exhaust gases of the gas turbine 102. Thus, feedwater from a condenser 401 to the waste heat recovery boiler 200 is heated at the fuel economizer 203, vaporized at the evaporator 202 and drum 205, superheated at the superheater 201 and supplied to a steam turbine generating device 300 to be used as steam for driving the steam turbine.

A steam turbine generating device 300 comprises a high-pressure steam turbine 303, a low-pressure steam turbine 304, a main steam conduit 301 for introducing steam from the superheater 201 of the waste heat recovery boiler 200 into the high-pressure steam turbine 303, a steam valve 302 mounted in the main steam conduit 301 for controlling the amount of steam flowing into the high-pressure steam turbine 303, and a generator 305 driven by the steam turbines 303 and 304. Thus, the steam that has done work at the steam turbines 303 and 304 is condensed at the condenser 401 and supplied to the waste heat recovery boiler 200 by a condenser pump 402 and a feedwater pump 405 through a feedwater conduit 403. A feedwater heater 404 is mounted in the feedwater conduit 403 and receives extracted-steam from the steam turbine 303 through an extracted-steam conduit 407, so as to heat the feedwater supplied to the fuel economizer 203 of the waste fuel recovery boiler 200.

A turbine bypass system comprising a bypass conduit 408 having a turbine bypass valve 409 mounted therein and connecting the main steam conduit 301 to the condenser 401 is provided, so as to discharge excess main steam to the condenser 401 by bypassing the steam turbine 303.

Figure 2:
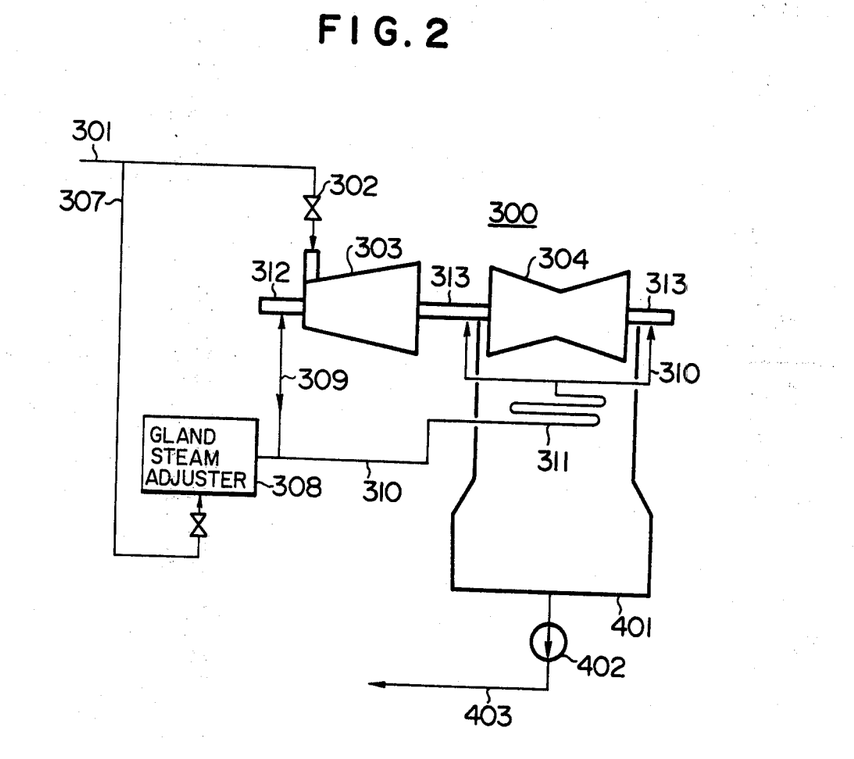
FIG. 2 is a view showing, in general, the steam turbine gland sealing steam supply system of the combined power plant shown in FIG. 1.

FIG. 2 shows, in general, the steam turbine gland sealing steam supply system for the steam turbine generating device 300. The steam turbine gland sealing steam supply system comprises a gland sealing steam conduit 307 branched from the main steam conduit 301, a gland sealing steam adjuster 308, a high-pressure gland sealing steam conduit 309, a low-pressure gland sealing steam conduit 310, a cooling loop conduit 311, a high-pressure gland section 312 and low-pressure gland sections 313. When the condenser 401 is maintained at a vacuum at the time of shutdown or startup or during shutdown, the high-pressure turbine 303 and low-pressure turbine 304 are maintained substantially in a vacuum state, so that the steam in the main steam conduit 301 has its pressure reduced at the steam adjuster 308 to supply steam of reduced pressure to the high-pressure gland section 312 and the low-pressure gland sections 313 to provide a seal, to thereby prevent atmospheric air from flowing into the turbines through the gland sections 312 and 313. Also, when the steam turbine operates at load, the pressure in the high-pressure turbine 303 rises above the atmospheric pressure, so that the steam extracted from the high-pressure gland section 312 is supplied through the high-pressure gland sealing steam conduit 309, low-pressure gland sealing steam conduit 310 and cooling loop conduit 311 to the low-pressure gland sections 313 to provide a seal.

Figure 3:
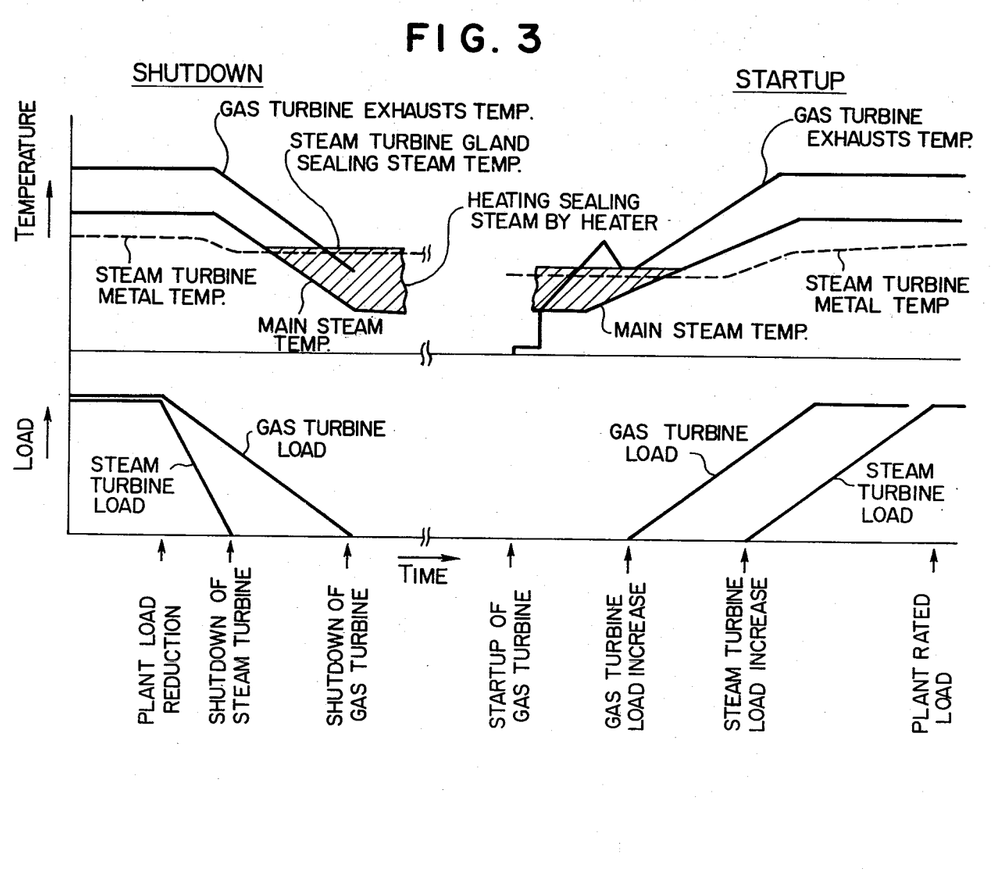
FIG. 3 graphically shows a method for the shutdown and restarting of the combined plant in accordance with an embodiment of the present invention.

FIG. 3 is a graph showing shutdown-restarting curves obtained at a hot start (a start of turbine following lapse of about 10 hours after shutdown) of the combined plant according to the present invention.

In the shutdown curves, the load may be reduced by simultaneously reducing the load applied to the steam turbine and the load applied to the gas turbine or by reducing the load applied to the steam turbine earlier than the load applied to the gas turbine. As described hereinabove, a reduction in the load applied to the gas turbine causes a reduction in the temperature of wastes released from the gas turbine. This also causes a reduction in the temperature of main steam. Thus, a simultaneous shutdown of the gas turbine and steam turbine results in a shutdown of the plant in a condition in which the steam turbine metal has a low temperature because the main steam flowing into the turbine has a low temperature. To obviate this problem, the method for the shutdown of a combined power plant according to the invention contemplates the provision of a time lag to the shutdown of the gas turbine behind the shutdown of the steam turbine. More specifically, the method provides for a reduction in the speed at which the load applied to the gas turbine is reduced so that the gas turbine is still in operation at a high load of not less than 50-70% even after the steam turbine is shutdown. And the main steam (excess steam), generated in the waste heat recovery boiler after shutdown of the turbine, is discharged to the condenser through the turbine bypass conduit. Thus, after the load applied to the gas turbine is reduced with the lapse of time and when the gas turbine is completely shutdown, no main steam of reduced temperature is introduced into the steam turbine, so that a reduction in the temperature of the steam turbine metal can be avoided.

In the method for the shutdown of the combined power plant described hereinabove, the steam turbine metal has a high temperature immediately after shutdown of the steam turbine. However, it is necessary to maintain the condenser at a vacuum because steam flows into the condenser from the turbine bypass system following shutdown of the steam turbine. It will take several minutes to open a vacuum breaking valve to destroy the vacuum in the condenser, so that while the condenser is at a vacuum, sealing steam is supplied to the steam turbine gland sections by reducing the pressure of the main steam at the gland sealing steam adjuster. A reduction in the load applied to the gas turbine results in a reduction in the temperature of the main steam, so that the temperature of the gland sealing steam will also drop. Because of this, a flow of the gland sealing steam of reduced temperature into the interior of the steam turbine through the gland sections causes a reduction in the temperature of the steam turbine metal because the latter is cooled. In order to avoid the reduction in the temperature of the steam turbine metal, a heater is provided according to the invention to heat the gland sealing steam whose temperature drops as a result of a reduction in the load applied to the gas turbine, so as to adjust the temperature of the gland sealing steam to the level of the temperature of the steam turbine metal of the post-initial stages of the steam turbine. This gland sealing steam is supplied to the steam turbine gland sections until the vacuum in the condenser is changed into atmospheric pressure. In this way, the steam turbine metal can be maintained at a high temperature level after the steam turbine is shutdown, so that the temperature of the steam turbine metal can be still kept at a high temperature level at the time of restarting following the shutdown lasting for about 10 hours in spite of the fact that the metal may be cooled to a certain degree by spontaneous dissipation of heat.

Next, the starting curve will be discussed. When the combined power plant is started, the gas turbine is first started, and after steam is generated in the waste heat recovery boiler, the steam turbine is started at the time when the temperature of the main steam substantially matches the temperature of the steam turbine metal of the post-initial stages of the steam turbine. It is necessary to increase the degree of vacuum in the condenser before the steam turbine is started. Thus in the case of a hot start, sealing steam is supplied to the steam turbine gland sections by utilizing steam produced by residual pressure in the waste heat recovery boiler to thereby increase the vacuum in the condenser. When this is the case, the steam turbine metal has a high temperature as described hereinabove but the steam turbine metal will be cooled if the steam from the main steam conduit has its pressure reduced as it stands and supplied to the gland sections as sealing steam because such steam has a low temperature. To obviate this disadvantage, also at the time of starting, the sealing steam extracted from the main steam conduit for supply to the steam turbine gland sections is heated to a temperature level substantially equal to that of the steam turbine metal of the post-initial stages, before being supplied to the steam turbine gland sections.

Figure 4:
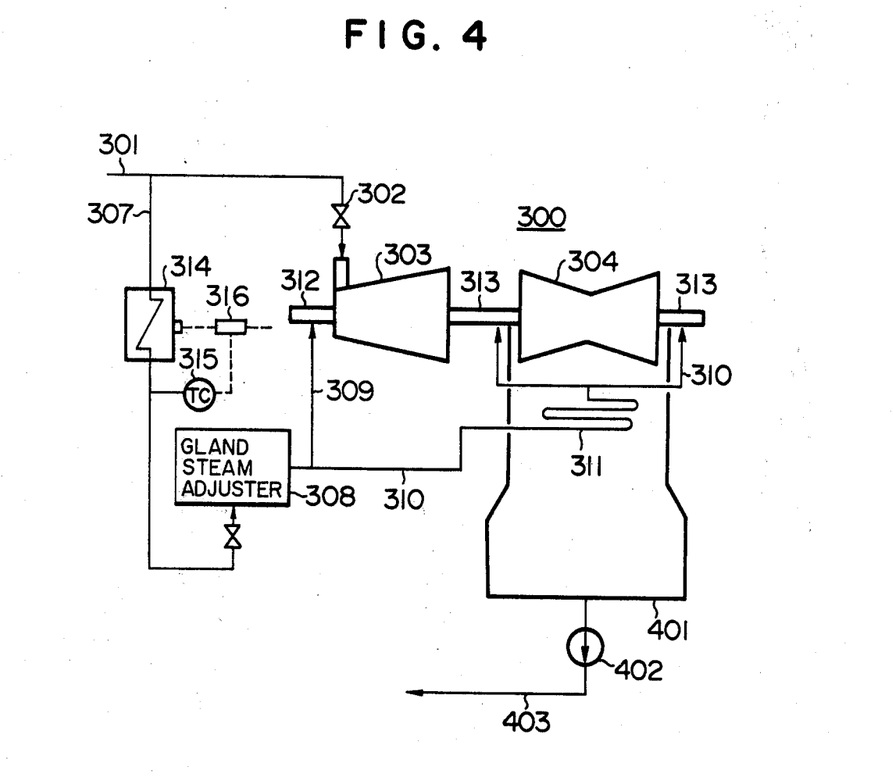
FIG. 4 is a view showing the steam turbine gland sealing steam supply system of the combined power plant which may be used for carrying out the method of the invention.

FIG. 4 shows an example of the steam turbine gland sealing steam supply system which may be used for the present invention. The supply system illustrated comprises a heater for heating sealing steam supplied to the steam turbine gland sections at the time of shutdown and startup or during shutdown. The steam turbine gland sealing steam supply system shown in FIG. 4 is substantially similar to that shown in FIG. 2 except that in the former an electric heater 314 is provided anterior to the gland steam adjuster 308. The electric heater 314 controls the temperature of steam at the outlet thereof by controlling a voltage regulator 316 through a temperature regulator 315 (the temperature regulator setting the steam temperature at a level substantially equal to that of the temperature of the steam turbine metal) mounted at the outlet of the electric heater 314.

One example of the meritorious effects achieved by the present invention in reducing the time required for starting the combined power plant will now be described.

In a combined power plant wherein the exhausts from the gas turbine at rated load have a temperature of 560° C., and the main steam has a pressure of 56 Kg/cm²g and a temperature of 480° C., the temperature of exhaust gases from the gas turbine will be 250° C., the main steam will have a temperature of 230° C. and the metal of the high-pressure gland section 312 of the steam turbine will have a temperature of 130° C. at the time the steam turbine is shutdown, if the gas turbine and the steam turbine are simultaneously shutdown and the steam turbine gland sealing steam is not heated by a heater. The temperature of the metal of the high-pressure gland section 312 of the steam turbine will drop to 110° C. by spontaneous dissipation of heat after lapse of 10 hours following shutdown. At the time of starting, the temperature of the steam turbine metal will rise from 110° C. to the temperature of 400° C. of the metal at rated load, so that the variation in the temperature of the metal will be 400° C.−110° C.=290° C.

Figure 5:
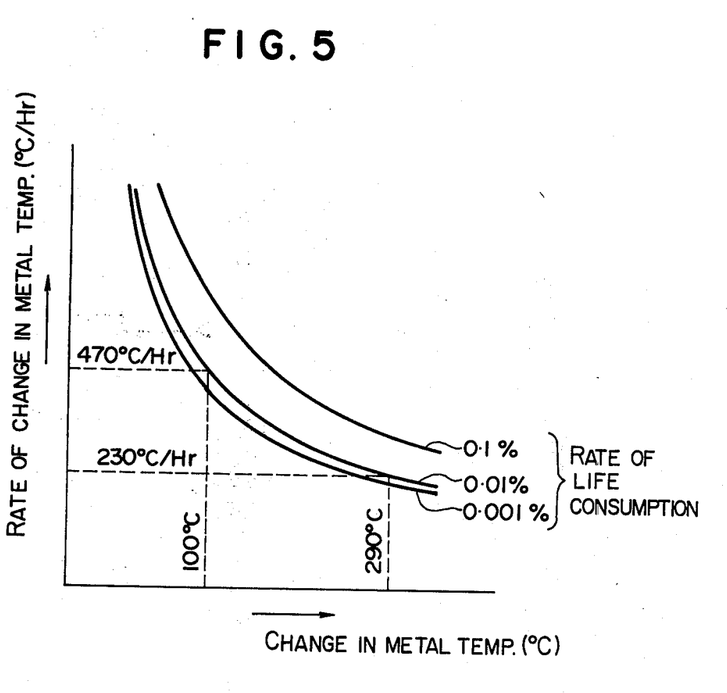
FIG. 5 graphically shows an example of limits placed on changes in the temperature of the steam turbine metal.

FIG. 5 shows one example of the curves representing limitations placed on the changes in the temperature of the steam turbine metal. The rate of change of the metal temperature will be 230° C./hr when the variation in the temperature of metal is 290° C. and the rate of consumption of life (which represents the consumption of life due to thermal stress produced in the steam turbine metal in one shutdown or starting) is 0.01%, so that the time required for starting the steam turbine will be 290° C.÷230° C./hr=1.26 hr (76 minutes).

Meanwhile if, for example, the steam turbine is shutdown when the gas turbine still operates at 80% load and if the steam turbine gland sealing steam is heated by means of a heater to a temperature level substantially equal to that of the metal of the high-pressure gland section 312 of the steam turbine at the time of shutdown and starting according to the present invention, the exhausts from the gas turbine will have a temperature of 550° C., the main steam will have a temperature of 470° C. and the temperature of the steam turbine metal will be 370° C. at the time of shutdown of the steam turbine, with the steam turbine metal being cooled by spontaneous dissipation of heat and having its temperature reduced to 300° C. in 10 hours after the steam turbine is shutdown. Thus, the change in the temperature of steam turbine metal from the time of starting of the steam turbine to its operation at rated load will be 400° C.−300° C.=100° C.

From FIG. 5, it will be seen that the rate of change of the metal temperature is 470° C./hr, when the variation in the temperature of metal is 100° C. and the rate of consumption of life is 0.01%. Thus the time required for starting the steam turbine will be 100° C.÷470° C./hr=0.21 hr (13 minutes).

It will be appreciated that since the time required for starting the steam turbine by the method according to the present invention is 13 minutes in contrast with the corresponding time of 76 minutes of the prior art, it is possible to reduce the starting time by 63 minutes. This reduction enables the starting time of the combined power plant to be reduced.

According to the present invention, the meritorious effect of reducing the time required for starting a combined power plant can be achieved by shutting down the steam turbine while the gas turbine is still operating at high load and by heating the gland sealing steam to be supplied to the steam turbine gland sections to a temperature level substantially equal to that of the steam turbine metal at the time of shutdown and starting.

The embodiments shown in FIGS. 3 and 4 have been described with reference to a hot start wherein the time period of shutdown of the plant is about 10 hours. It is to be understood that the present invention is not limited to this time period of shutdown of the plant and that substantially same result can be achieved when the time period of shutdown of the plant is longer or shorter than 10 hours.

The present invention has been described as using the main steam as steam turbine gland sealing steam. It will be evident, however, that the invention can achieve substantially same effect by using, as steam turbine gland sealing steam, steam generated in the waste heat recovery boiler (drum steam or superheater outlet steam), steam from other units or steam of an auxiliary boiler, so long as the gland sealing steam is heated by a heater to a temperature level substantially equal to that of the steam turbine metal.

In the foregoing description, the heater used for heating the steam turbine gland sealing steam has been described as an electric heater. It is to be understood that the invention is not limited to this specific form of the heater and that any other heater, such as the one for effecting heating by burning gas, oil or other fuel, may be used with substantially same result as the electric heater.

Other embodiments of the present invention will be described hereunder.

The temperature of the metal of the low-pressure gland sections of the steam turbine is lower than that of the metal of the high-pressure gland section during operation at load, so that if the gland sealing steam of high temperature is supplied both to the high-pressure gland sealing section and the low-pressure gland sealing sections, the metal of the low-pressure gland sections will be subjected to a high degree of temperature change and disadvantages will be produced as a result. Embodiments of the invention capable of obviating such disadvantages will be described by referring to FIGS. 6-10. In these embodiments, the steam turbine gland sealing steam supply system is substantially similar to that shown in FIG. 4, so that only the differences will be described.

Figure 6:
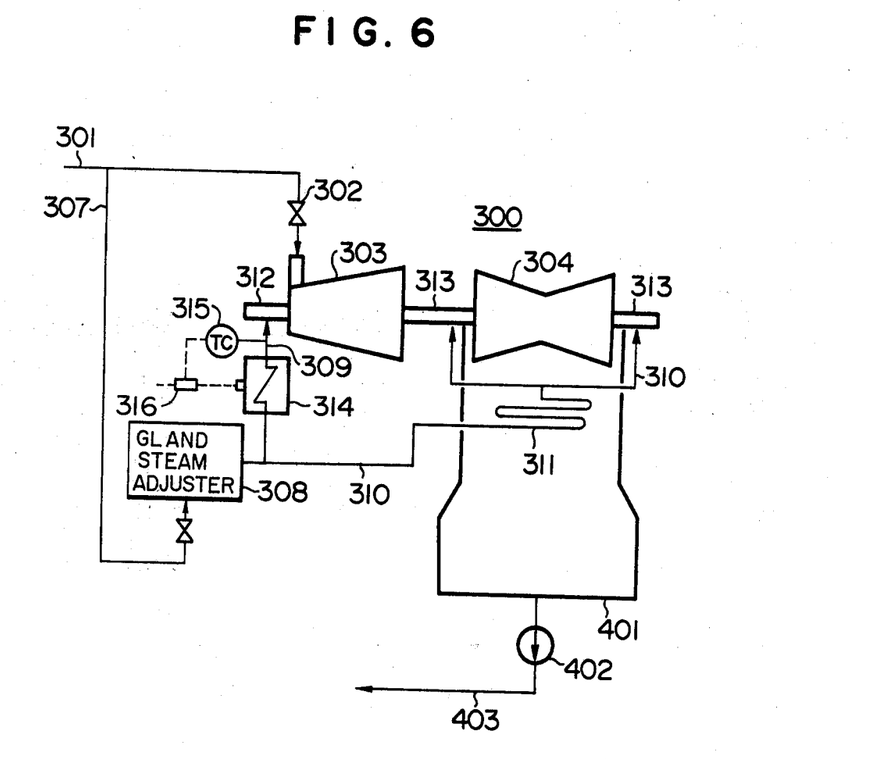
FIGS. 6 to 10 are views each showing a modification of the steam turbine gland sealing steam supply system which may be used for carrying out the method of the present invention.

FIG. 6 shows one of the other embodiments, wherein the electric heater 314 is mounted only in the high-pressure gland sealing steam conduit 309 for supplying gland sealing steam to the high-pressure turbine 303 so that the gland sealing steam supplied to the high-pressure turbine 303 at the shutdown and restarting or during shutdown can be heated to a temperature level substantially equal to that of the metal of the high-pressure gland section 312 of the steam turbine. The gland sealing steam supplied to the low-pressure turbine 304 is obtained from the main steam conduit 301, the main steam being supplied to the low-pressure turbine 304 as it is after having its pressure reduced at the gland steam adjuster 308.

Figure 7:
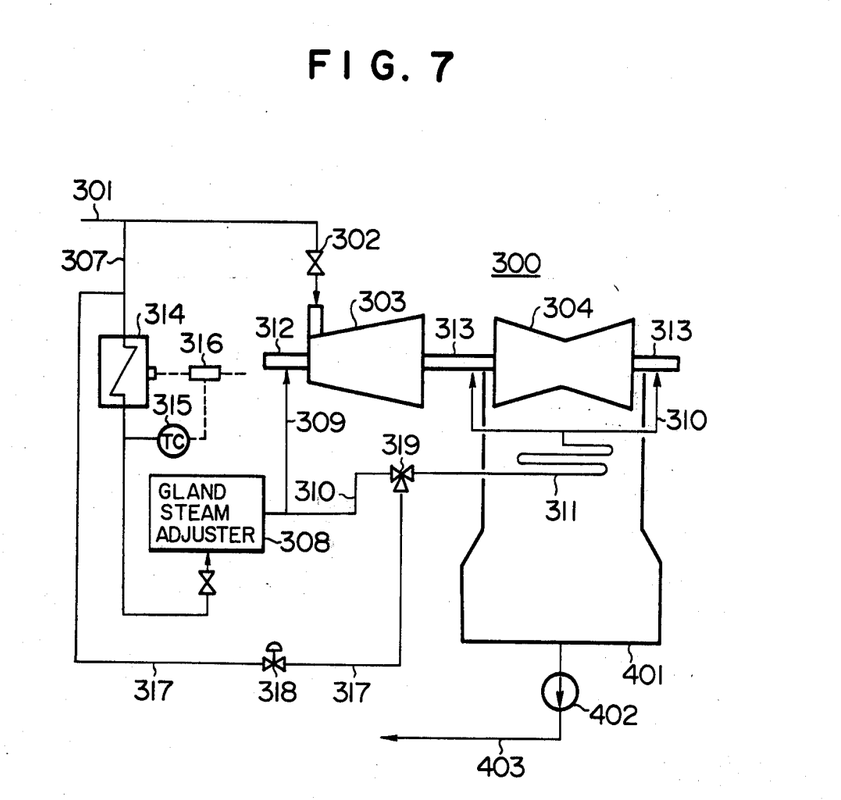

FIG. 7 shows an embodiment wherein the electric heater 314 is mounted anterior to the gland steam adjuster 308 in the gland sealing steam conduit 307, and a bypass sealing steam conduit 317 is provided to connect a point in the conduit 307 upstream of the heater 314 to the gland sections 313 of the low-pressure steam turbine 304 by bypassing the electric heater 314. The bypass conduit 317 has installed therein a pressure reducing valve 318 and a change-over valve 319. With this arrangement, at the time of shutdown and restarting or during shutdown of steam turbine, gland sealing steam heated by the electric heater 314 to a temperature level substantially equal to that of the metal of the high-pressure gland section can be supplied to the high-pressure gland section 312, and gland sealing steam bypassing the electric heater 314 can be supplied to the gland sections 313 of the low-pressure turbine 304.

Figure 8:
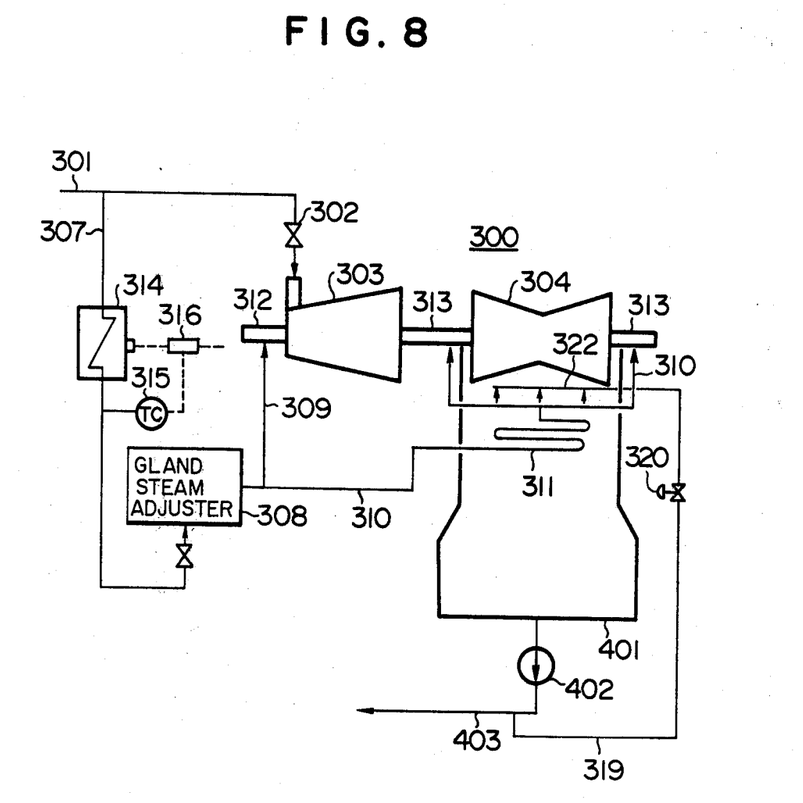

In FIG. 8, there is shown an embodiment wherein the electric heater 314 is mounted in the gland sealing steam conduit 307 anterior to the gland steam adjuster 308, and water spray device 322 is mounted above the cooling loop conduit 311 of the low-pressure gland sealing steam supply system for the gland sections 313 of the low-pressure turbine 304. By this arrangement, at the time of shutdown and restarting or during shutdown of steam turbine, gland sealing steam heated by the electric heater 314 to a temperature level substantially equal to that of the metal of the high-pressure gland section can be supplied to the gland section 312 of the high-pressure turbine 303 and gland sealing steam of lower temperature cooled by water ejected from the spray device 322 can be supplied to the gland sections 313 of the low-pressure turbine 304.

Figure 9:
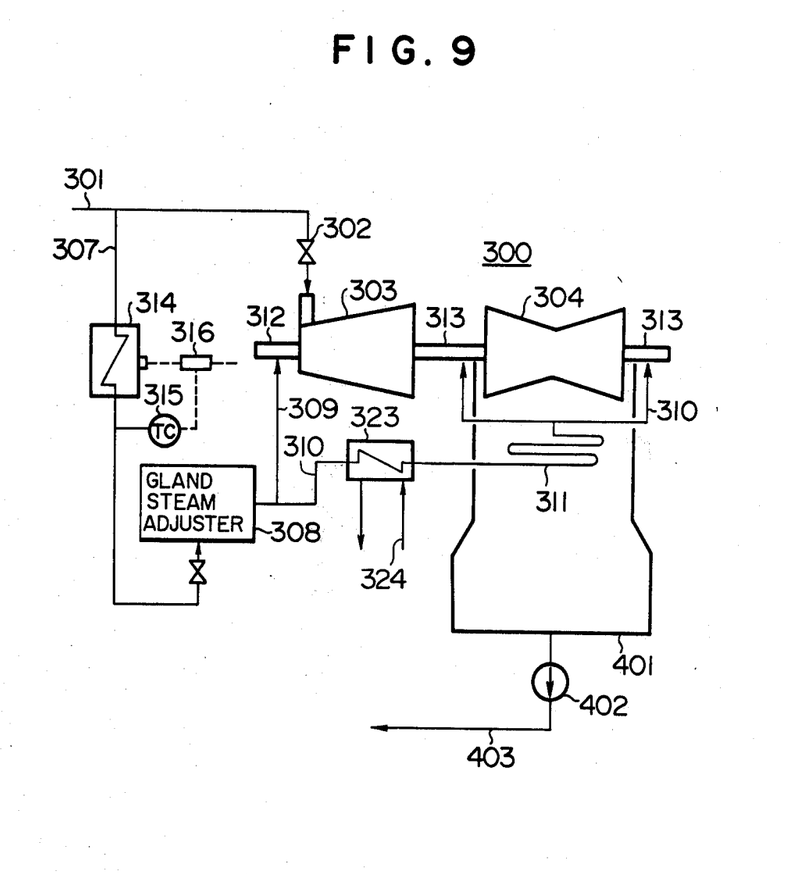

FIG. 9 shows an embodiment wherein the electric heater 314 is mounted anterior to the gland steam adjuster 308 in the gland sealing steam conduit 307, and water-steam heat exchanger 323 is mounted in the low-pressure gland sealing steam conduit 310 for supplying sealing steam to the gland sections 313 of the low-pressure turbine 304. By this arrangement, gland sealing steam heated by the electric heater 314 to a temperature level substantially equal to that of the metal of the high-pressure gland section can be supplied to the gland sealing section 312 of the high-pressure turbine 303 and gland sealing steam of lower temperature cooled by cooling water 324 at the heat exchanger 323 can be supplied to the gland sections 313 of the low-pressure turbine 304, at the time of shutdown and restarting or during shutdown of steam turbine.

Figure 10:
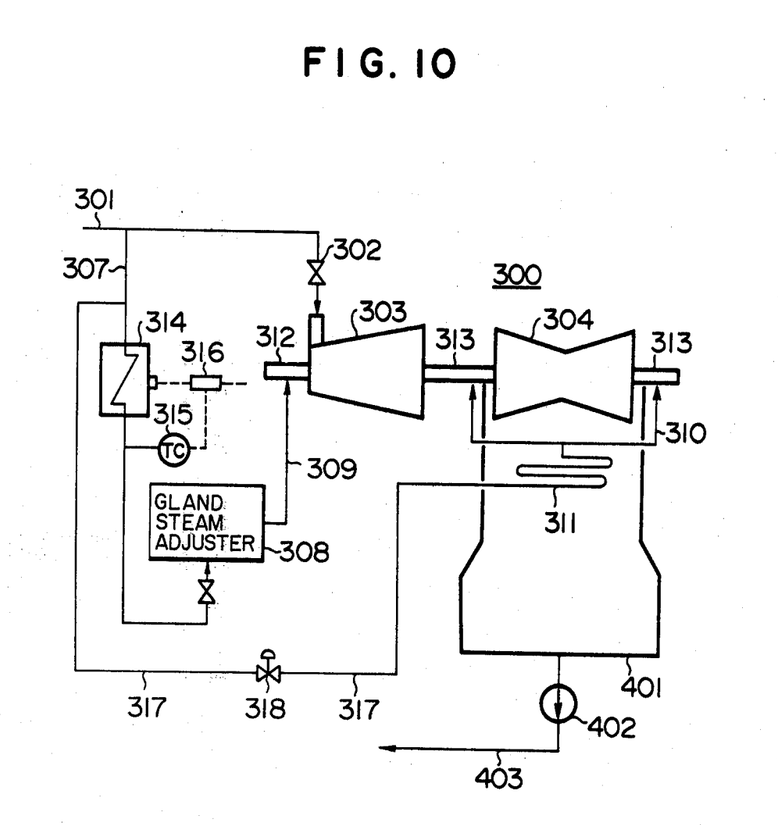

In the embodiment shown in FIG. 10, the electric heater 314 is mounted anterior to the gland steam adjuster 308 in the gland sealing steam conduit 307, and the bypass sealing steam conduit 317 having the pressure reducing valve 318 mounted therein connects a point in the gland sealing steam conduit 307 upstream of the electric heater 314 to the gland sectios 313 of the low-pressure turbine 304 by bypassing the electric heater 314. At the time of shutdown and restarting or during shutdown of steam turbine, gland sealing steam heated by the electric heater 314 to a temperature level substantially equal to that of the metal of the high-pressure gland section can be supplied to the gland section 312 of the high-pressure turbine 303, while gland sealing steam free from the influence of the electric heater 314 can be supplied at a low temperature to the gland sections 313 of the low-pressure turbine 304. Thus two gland sealing steam supply systems for the high-pressure turbine gland sealing and the low-pressure turbine gland sealing respectively are provided in this embodiment.

What is claimed is:

1. A method for a shutdown and restarting of a combined plant comprising in combination a gas turbine, a waste heat recovery boiler heated by a heat of exhausts from said gas turbine to generate steam, and a steam turbine driven by the steam generated by said waste heat recovery boiler, said method comprising the steps, which are followed when the plant is restarted following temporary shutdown, of:

(1) shutting down the steam turbine while the gas turbine is still operating at high load by reducing a load applied to the steam turbine before reducing the load applied to the gas turbine, when the load applied to the entire plant is to be reduced;

(2) allowing excess main steam produced by the load reduction and shutdown of the steam turbine to flow through a bypass system to a condenser without causing the excess main steam to flow through the steam turbine;

(3) maintaining metal of the steam turbine at a temperature level substantially equal to a temperature at which the metal is maintained during operation of the steam turbine by supplying steam, as gland sealing steam, of a temperature level substantially equal to a temperature level of the metal of the steam turbine in operation at the time of load reduction and shutdown of the steam turbine;

(4) shutting down the gas turbine after further reducing the gas turbine load to a level lower than a level attained in said steam turbine shutting down step;

(5) starting the gas turbine first to increase the load applied to the plant when the plant is to be restarted;

(6) maintaining the metal of the steam turbine at a temperature level substantially equal to the temperature level of the metal of the steam turbine attained during operation of the latter, by supplying steam of a temperature level substantially equal to a temperature level of the metal of the steam turbine attained during operation of the latter as gland sealing steam for the steam turbine; and (7) starting the steam turbine by the steam generated by the waste heat recovery boiler to increase the plant load.

2. A method as claimed in claim 1, wherein said gland sealing steam for maintaining the steam turbine metal temperature in said steam turbine metal temperature maintaining steps is at least one of a steam generated by said waste heat recovery boiler, main steam, steam of other units, and a steam generated by an auxiliary boiler, and heated by a heater.

3. A method as claimed in claim 2, wherein said steam turbine includes a high-pressure turbine and a low-pressure turbine and said gland sealing steam is supplied to both high-pressure and low-pressure gland sections, and wherein said heating of said gland sealing steam by said heater is effected only to the gland sealing steam which is to be supplied to said high-pressure gland section.

4. A method as claimed in claim 2, wherein said steam turbine includes a high-pressure turbine and a low-pressure turbine, and wherein said gland sealing steam heated by said heater is supplied to said high-pressure gland section, while said heated gland sealing steam is supplied to low-pressure gland sections after it has been cooled.

5. A method as claimed in claim 1, wherein said first-mentioned metal temperature maintaining step, gas turbine shutting down step, gas turbine starting step and second-mentioned metal temperature maintaining step are carried out continuously.

* * * * *